United States Patent
Glen et al.

(10) Patent No.: US 8,933,947 B2
(45) Date of Patent: Jan. 13, 2015

(54) READING A LOCAL MEMORY OF A PROCESSING UNIT

(75) Inventors: David I. J. Glen, Toronto (CA); Philip J. Rogers, Pepperell, MA (US); Gordon F. Caruk, Brampton (CA); Gongxian Jeffrey Cheng, Toronto (CA); Mark Hummel, Franklin, MA (US); Stephen Patrick Thompson, Longmont, CO (US); Anthony Asaro, Toronto (CA)

(73) Assignees: ATI Technologies ULC, Ontario (CA); Advanced Micro Devices, Inc., Sunnyvale, CA (US)

( * ) Notice: Subject to any disclaimer, the term of this patent is extended or adjusted under 35 U.S.C. 154(b) by 966 days.

(21) Appl. No.: 12/719,628

(22) Filed: Mar. 8, 2010

(65) Prior Publication Data
US 2011/0057939 A1 Mar. 10, 2011

Related U.S. Application Data (60) Provisional application No. 61/241,236, filed on Sep. 10, 2009.

(51) Int. Cl.
*G06T 15/00* (2011.01)
*G06F 12/02* (2006.01)
*G06F 12/08* (2006.01)
(Continued)

(52) U.S. Cl.
CPC *G06F 3/14* (2013.01); *G09G 5/001* (2013.01); *G09G 5/363* (2013.01); *G09G 5/393* (2013.01); *G09G 2350/00* (2013.01); *G09G 2360/121* (2013.01)
USPC ............ 345/522; 345/520; 710/100; 711/154

(58) Field of Classification Search
CPC ............ G06F 3/14; G06T 1/20; G09G 5/001; G09G 5/006; G09G 5/363
See application file for complete search history.

(56) References Cited

U.S. PATENT DOCUMENTS 6,470,416 B2 * 10/2002 Chang ........................... 711/105
6,842,180 B1    1/2005 Maiyuran et al.
(Continued)

FOREIGN PATENT DOCUMENTS

CN          1952979 A      4/2007
CN          101526934 A    9/2009
(Continued)

OTHER PUBLICATIONS

International Search Report with Opinion of the International Searching Authority directed to related International Application No. PCT/US2010/048214, mailed Jan. 17, 2011, European Patent Office, Rijswijk, Netherlands; 10 pages.
(Continued)

*Primary Examiner* — Kee M Tung
*Assistant Examiner* — Michelle Chin
(74) *Attorney, Agent, or Firm* — Volpe and Koenig, P.C.

(57) ABSTRACT

Disclosed herein are systems, apparatuses, and methods for enabling efficient reads to a local memory of a processing unit. In an embodiment, a processing unit includes an interface and a buffer. The interface is configured to (i) send a request for a portion of data in a region of a local memory of an other processing unit and (ii) receive, responsive to the request, all the data from the region. The buffer is configured to store the data from the region of the local memory of the other processing unit.

15 Claims, 5 Drawing Sheets

(51) Int. Cl.
*G06F 13/00* (2006.01)
*G06F 3/14* (2006.01)
*G09G 5/00* (2006.01)
*G09G 5/36* (2006.01)
*G09G 5/393* (2006.01)

(56) References Cited

U.S. PATENT DOCUMENTS

| | | | |
|---|---|---|---|
| 6,956,579 B1* | 10/2005 | Diard et al. | 345/537 |
| 8,004,531 B2 | 8/2011 | Chen et al. | |
| 2002/0116576 A1 | 8/2002 | Keshava et al. | |
| 2003/0210248 A1* | 11/2003 | Wyatt | 345/541 |
| 2006/0294302 A1 | 12/2006 | Aguaviva | |
| 2007/0273699 A1* | 11/2007 | Sasaki et al. | 345/502 |
| 2008/0098178 A1 | 4/2008 | Veazy et al. | |
| 2008/0215820 A1* | 9/2008 | Conway | 711/141 |
| 2010/0118043 A1* | 5/2010 | Minkin et al. | 345/582 |
| 2011/0096079 A1* | 4/2011 | Carter | 345/520 |

FOREIGN PATENT DOCUMENTS

| | | |
|---|---|---|
| EP | 1 739 560 A2 | 1/2007 |
| JP | 2008-108256 A | 5/2008 |
| JP | 2008-305082 A | 5/2008 |

OTHER PUBLICATIONS

Office Action dispatched Apr. 23, 2014, in Japanese Patent Application No. 2012-528888, Mr. Hayakawa Yuji et al., drafted Apr. 15, 2014 with English language translation.

European language abstract of Japanese Patent No. JP 2008-305082 A European Patent Office, espacenet database—Worldwide, Pub. Date: Dec. 18, 2008.

Office Action issued Mar. 25, 2014, in Chinese Patent Application No. 201080043604.4 with English language translation.

English language abstract of Chinese Patent No. CN 101526934 A European Patent Office, espacenet database—Worldwide.

* cited by examiner

READING A LOCAL MEMORY OF A PROCESSING UNIT

CROSS REFERENCE TO RELATED APPLICATIONS

This application claims benefit under 35 U.S.C. §119(e) to U.S. Provisional Patent Application No. 61/241,236, entitled "Fast CPU Reads to GPU Local Memory," to Glen et al., filed Sep. 10, 2009, the entirety of which is hereby incorporated by reference as if fully set forth herein.

BACKGROUND

1. Field of the Invention

The present invention is generally directed to computing operations performed in computing systems.

2. Background Art

A conventional computing system includes a plurality of hardware components, such as a central processing unit (CPU) and a graphics processing unit (GPU). The CPU is an integrated circuit (IC) that coordinates the operations of all the other devices of the computing system. A GPU is an integrated circuit that is adapted to perform data-parallel computing tasks, such as graphics-processing tasks. A GPU may, for example, execute graphics-processing tasks required by an end-user application, such as a video-game application.

A conventional computing system also includes system memory, such as random access memory (RAM). Typically, the CPU and GPU each have access to the system memory. In addition to the system memory, the GPU may also be coupled to a local memory.

Unfortunately, CPU reads to GPU local memory are slow. Specifically, reads are performed uncached (UC), meaning that the data that is read is not copied into a local cache memory. Also, all uncached reads are 32 or 64 bits wide and serialized, meaning that the CPU only issues one read request at a time, and waits for the data from the read request to return data prior to issuing another read request. As a result, CPU reads to GPU local memory are conventionally slow.

What is needed, therefore, are systems, apparatuses, and methods for enabling a first processing unit (e.g., CPU) to quickly read a local memory of a second processing unit (e.g., GPU).

SUMMARY OF EMBODIMENTS OF THE INVENTION

The present invention meets the above-described needs by providing systems, apparatuses, and methods that provide fast reads to a local memory of a processing unit.

For example, an embodiment of the present invention provides a computer-implemented method for enabling a first processing unit to efficiently read a local memory of a second processing unit. According to this computer-implemented method, a request for a portion of data in a region of a local memory of the second processing unit is sent via an interface between the first processing unit and the second processing unit. Responsive to the request, all data from the region is received. This computer-implemented method may further include storing the data from the region in a buffer. A subsequent request for data in the region may be serviced from the buffer.

Another embodiment of the present invention provides a processing unit, including an interface and a buffer. The interface is configured to (i) send a request for a portion of data in a region of a local memory of another processing unit and (ii) receive, responsive to the request, all the data from the region. The buffer is configured to store the data from the region of the local memory of the other processing unit. In an example, a subsequent request for data in the region is serviced from the buffer.

A further embodiment of the present invention provides a computing system, including a first processing unit and a second processing unit. The second processing unit is coupled to a local memory. The first processing unit includes an interface configured to (i) send a request for a portion of data in a region of the local memory of the second processing unit and (ii) receive, responsive to the request, all the data from the region. The first processing unit may also include a buffer configured to store the data from the region of the local memory of the second processing unit. A subsequent request for data in the region may be serviced from the buffer.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Overview

Embodiments of the present invention are directed to fast reads to a local memory of a processing unit, and applications thereof. In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
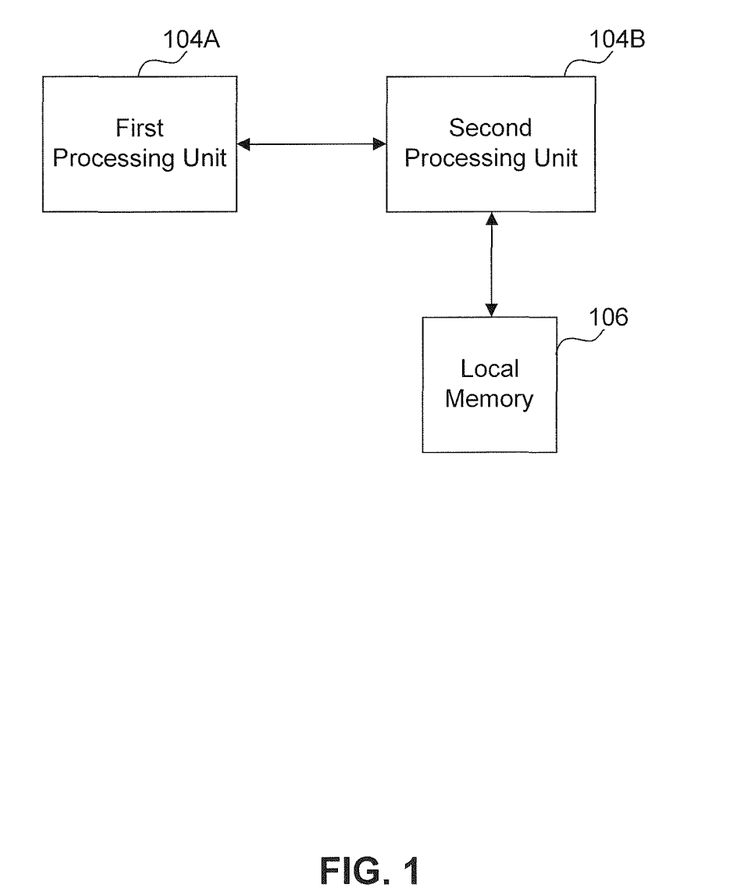
FIG. 1 illustrates a first processing unit configured to read the local memory of a second processing unit in accordance with an embodiment of the present invention.

Embodiments enable a first processing unit 104A to efficiently read a local memory 106 of a second processing unit 104B, as illustrated in FIG. 1. Processing units 104 are coupled together by a bus, and may be included in separate packages (or chips) or may be included in a single package (or chip). Each processing unit 104 may comprise a CPU, a GPU, a video processing unit, a coprocessor (e.g., a floating-point processor, etc.), and/or another type of processing unit.

For illustrative purposes only, and not limitation, embodiments of the present invention will be described herein in terms of reading the local memory of a GPU. A person skill in the relevant art(s) will appreciate, however, that embodiments of the present invention may be applied to read the local memories of other types of processing units, such as central processing units and coprocessors. Such other embodiments are contemplated within the spirit and scope of the present invention.

An embodiment of the present invention is directed to improving the performance of CPU reads to GPU local memory, without compromising write performance. For example, embodiments of the present invention may provide CPU reads to GPU local memory that are greater than ten times faster than conventional CPU reads to GPU local memory. To provide fast CPU reads to GPU local memory, the read mechanism, which is part of the WC memory type, is changed to be read combining (RC). In this regard, a CPU north bridge is configured to include one or more read buffers to support read combining. In an embodiment, the one or more read buffers are of cache-line length (e.g., 64 bytes wide).

Another embodiment of the present invention enables a first GPU to efficiently read from a second CPU's local memory. In a conventional system including two or more GPUs connected by a peripheral component interconnect express (PCIE) bus, a first GPU cannot efficiently read from the memory of a second GPU because it would be too slow. Speeding up the read path from CPU to GPU local memory, in accordance with an embodiment of the present invention, enables peer-to-peer reads to be implemented in an efficient and useful manner.

Before describing such CPUs and CPUs in detail, it is first helpful to describe an example computer system in which such CPUs and GPUs may be implemented.

II. An Example Computing System

Figure 2:
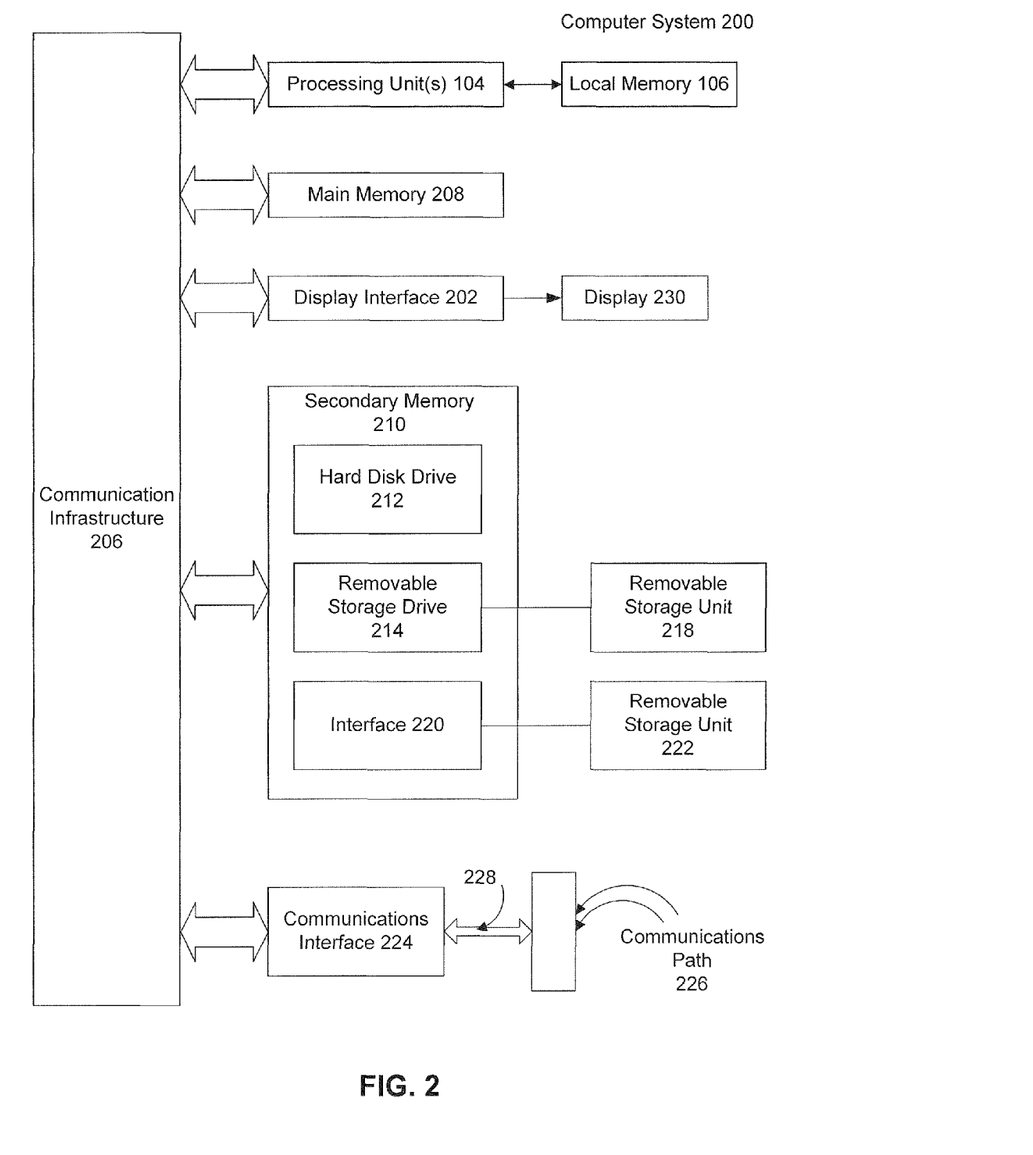
FIG. 2 illustrates an example computing system in accordance with an embodiment of the present invention.

Embodiments of the present invention may be implemented using hardware, software or a combination thereof and may be implemented in one or more computing systems or other processing systems. FIG. 2 illustrates an example computing system 200.

Computing system 200 includes one or more processing units 104. Processing unit(s) 104 may be a general-purpose processing unit (such as, a CPU) or a special-purpose processing unit (such as, a GPU). Processing unit(s) 104 is (are) connected to a communication infrastructure 206 (e.g., a communications bus, cross-over bar, or network). At least one of the processing units 104 is also coupled to local memory 106. As explained in more detail below, one or more of the other processing units 104 may efficiently access the local memory 106 in accordance with an embodiment of the present invention.

Computing system 200 also includes a display interface 202 that forwards graphics, text, and other data from communication infrastructure 206 (or from a frame buffer not shown) for display on display unit 230 (such as, a liquid crystal display).

Computing system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well known manner. Removable storage unit 218 represents a floppy disk, magnetic tape, optical disk, etc. which is read by and written to by removable storage drive 214. As will be appreciated, the removable storage unit 218 includes a computer-readable storage medium having stored therein computer software and/or data.

In alternative embodiments, secondary memory 210 may include other similar devices for allowing computer programs or other instructions to be loaded into computing system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computing system 200.

Computing system 200 may also include a communications interface 224. Communications interface 224 allows software and data to be transferred between computing system 200 and external devices. Examples of communications interface 224 may include a modem, a network interface (such as an Ethernet card), a communications port, a Personal Computer Memory Card International Association (PCM-CIA) slot and card, etc. Software and data transferred via communications interface 224 are in the form of signals 228 which may be electronic, electromagnetic, optical or other signals capable of being received by communications interface 224. These signals 228 are provided to communications interface 224 via a communications path (e.g., channel) 226. This channel 226 carries signals 228 and may be implemented using wire or cable, fiber optics, a telephone line, a cellular link, an radio frequency (RF) link and other communications channels.

In this document, the term "computer-readable storage medium" is used to generally refer to media such as removable storage drive 214 and a hard disk installed in hard disk drive 212. These computer program products provide software to computing system 200.

Computer programs (also referred to as computer control logic) are stored in main memory 208 and/or secondary memory 210. Computer programs may be loaded into computing system 200 using removable storage drive 214, hard drive 212 or communications interface 224. Such computer programs, when executed, enable the computing system 200 to perform the features of the present invention, as discussed herein. In particular, the computer programs, when executed, enable one of processing units 104 to efficiently read the local memory 106 of another one of processing units 104 in accordance with an embodiment of the present invention. Accordingly, such computer programs represent controllers of the computing system 200.

III. Example Processing Units

Figure 3:
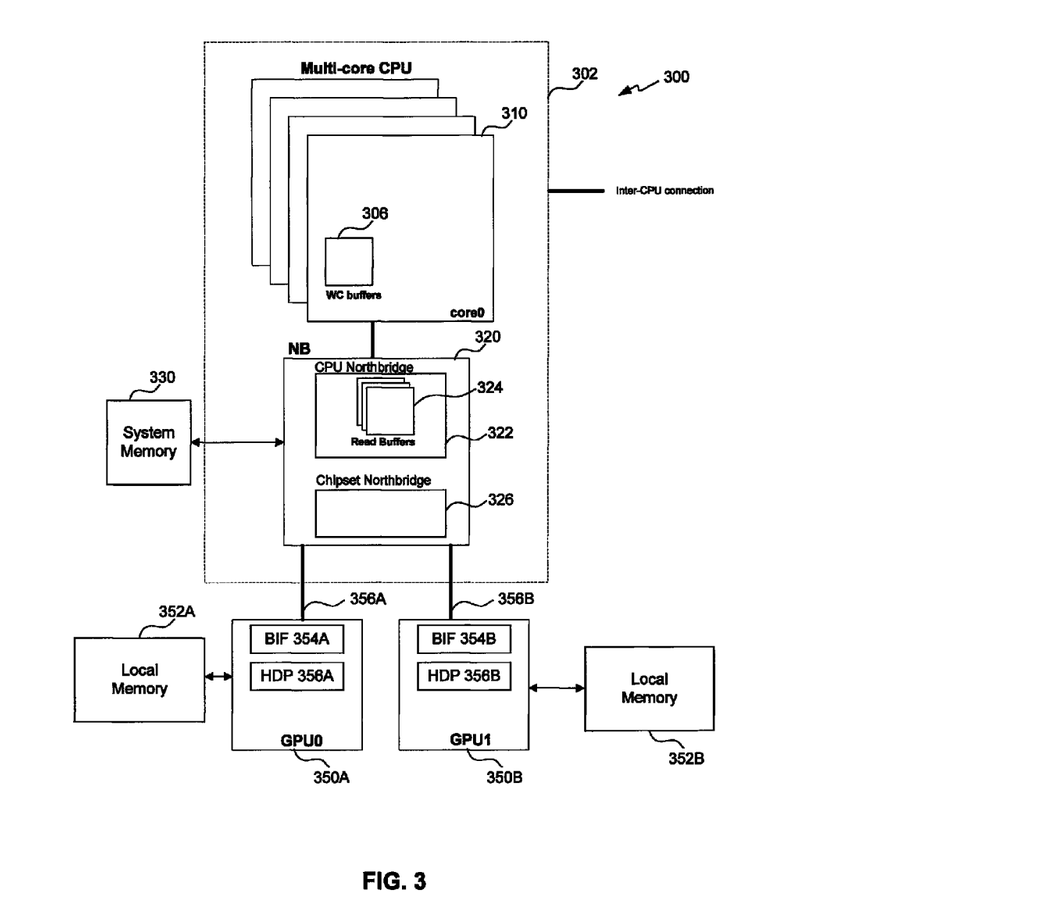
FIG. 3 illustrates an example CPU and GPU in accordance with an embodiment of the present invention.

FIG. 3 illustrates example processing units 104, wherein a first processing unit reads a local memory of a second processing unit in accordance with an embodiment of the present invention. For example, FIG. 3 illustrates a CPU 302, a first GPU 350A coupled to a first local memory 352A, and a second GPU 350B coupled to a second local memory 352B. Although illustrated as separate and similar devices, GPU 350B and GPU 350A may be part of a single board, part of a single package (e.g., two integrated circuits in single package like a multi-chip module) or separate cores in a single device. Additionally and alternatively, GPU 350A and GPU 350B are not necessarily identical but may be different. For example, GPU 350A may be embodied as an integrated graphics device (such as a device integrated into chipset northbridge 326) while GPU 350B may be embodied in a separate or discrete GPU device.

CPU 302 includes one or more cores 310 and a northbridge 320. Each core 310 includes one or more write buffers 306, enabling write combining. In an embodiment, northbridge 320 includes a CPU northbridge 322 and a chipset northbridge 326. In another embodiment, chipset northbridge 326 is not incorporated within CPU 302. Northbridge 320 is coupled to a system memory 330.

CPU 302 is coupled to first GPU 350A by an interface 356A and is coupled to second GPU 350B by an interface 356B. Interfaces 356 are, for example, a peripheral component interface (PCI) bus, an accelerated graphics port (AGP) bus, a PCI Express (PCIE) bus, or another type of bus used in computing systems.

Each GPU 350 includes a bus interface (BIF) 354 and a host data path (HDP) 356. Bus interface 354 implements a protocol to communicate over interface 356. Host data path 356 provides CPU 302 access to local memories 352.

In operation, CPU 302 may make read requests to first local memory 352A of first GPU 350A or to second local memory 352B of second GPU 350B. The first 4 bytes (32 bits) or 8 bytes (64 bits) of each read request to an address in a 64-byte region cause the whole 64-byte line in local memory 352 to be read to read buffer 324. All subsequent reads to the same 64-byte line hit in read buffer 324 and so return data to CPU 302 much faster than conventional reads.

In addition, CPU 302 may allow multiple uncached reads to be in flight at the same time, thereby allowing reads to memory 352 to go even faster. To support this functionality, end-point hardware of GPU 350 is specially configured. Specifically, bus interface (BIF) 354 and host data path (HDP) 356 are configured to enable multiple uncached reads to be in flight at the same time.

Further improvements are obtained by including multiple read buffers in CPU northbridge 322. Sharing write buffers 306 already in CPU northbridge 322 to be also used for read buffers improves performance still further for several reasons. First, sharing hardware reduces cost. Second, sharing hardware does not cost performance in most interesting cases. Third, shared buffers for writes and reads make it easier to detect and correct read-after-write hazards.

In an embodiment, a data path is added to chipset northbridge 326 to enable peer-to-peer reads (e.g., reads from first GPU 350A to second GPU 350B, and vice versa). One or more read-combining buffers (such as, read buffers 324) may be dedicated for supporting the peer-to-peer read traffic. In this embodiment, the first 4 bytes (32 bit) or 8 bytes (64 bit) read from first GPU 350A to an address in a 64-byte region on second local memory 352B of second GPU 350B causes the whole 64-byte line in second local memory 352B to be read to a read buffer 324 of CPU northbridge 322. All subsequent reads to the same 64 byte line would hit in read buffer 324 and so return data to first GPU 350A much faster than conventional peer-to-peer reads. A similar mechanism enables second GPU 350B to read from first local memory 352A of first GPU 350A.

In addition, changing GPU 350 to allow multiple peer reads to be in flight allows peer-to-peer reads to go even faster. Moreover, multiple read buffers in CPU northbridge 322 may be included to further improve performance. Further, write buffers 306 may also be used for read buffers to provide additional performance gains for several reasons. First, sharing hardware reduces cost. Second, sharing hardware does not cost performance in most interesting cases. Third, shared buffers for writes and reads makes it easier to detect and correct read-after-write hazards.

IV. Example Operation

As mentioned above, embodiments of the present invention enable a first processing unit to efficiently read the local memory of a second processing unit. Described below is: (A) an example method, implemented by the first processing unit, for retrieving data stored in the local memory of the second processing unit; and (B) an example method, implemented by the second processing unit, for processing a request from the first processing unit.

Figure 4:
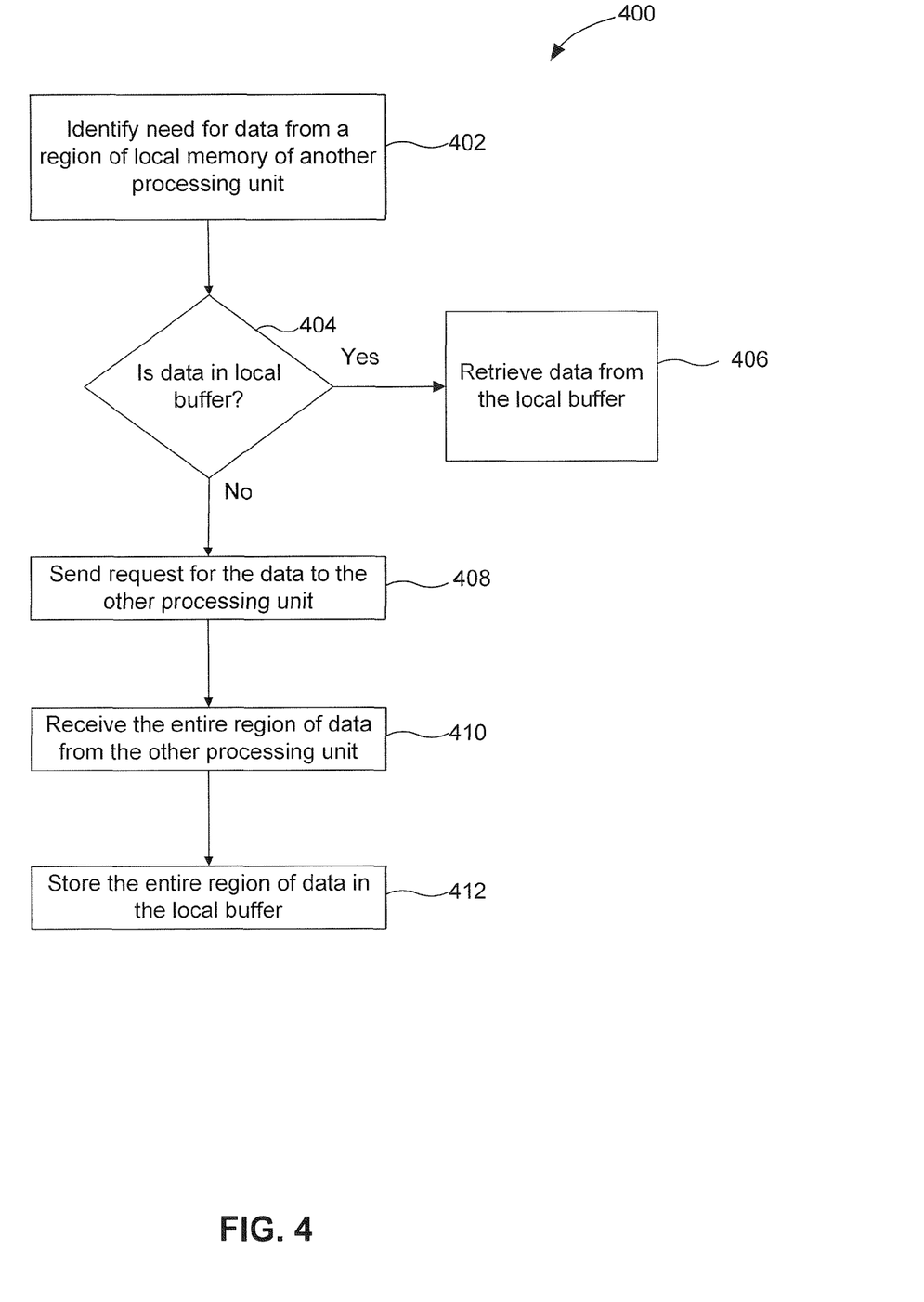
FIG. 4 is a flowchart illustrating an example method for retrieving data stored in the local memory of another processing unit in accordance with an embodiment of the present invention.

A. Example Method for Retrieving Data Stored in a Local Memory of a Processing Unit FIG. 4 is a flowchart illustrating an example method 400, implemented by a first processing unit, for retrieving data stored in the local memory of a second processing unit in accordance with an embodiment of the present invention. For example, method 400 may be implemented by CPU 302, first GPU 350A, and/or second GPU 350B. Method 400 of FIG. 4 is described below with reference to structure illustrated in FIG. 3.

Method 400 begins at a step 402 in which a first processing unit identifies a need for reading data from the local memory of a second processing unit. For example, CPU 302 may identify a need to read local memory 352A of first GPU 350A or local memory 352B of second GPU 350B. As another example, either first GPU 350A or second GPU 350B may identify a need for a peer-to-peer read to the local memory 352 of the other GPU.

In step 404, it is determined whether the required data is already stored in a local buffer. The required data may be stored in the local buffer if a previous request had been made to a region of the local memory of the other processing unit. For example, as explained above, if CPU 302 makes a read request to a memory region (e.g., 64-byte region) of local memory 352, then all the data from that region will be stored in read buffer 324.

If, in step 404, it is determined that the data is in the local buffer, then the required data is retrieved from the local buffer, as illustrated in a step 406. If, on the other hand, it is determined in step 404 that the data is not in the local buffer, then a read request for the required data is sent to the other processing unit, as illustrated in a step 408.

Unlike conventional read requests, multiple read requests may be sent in parallel in accordance with an embodiment of the present invention. For example, a first processing unit may send a first read request to a second processing unit and, before receiving the data corresponding to the first read request, may send a subsequent read request to the second processing unit or another processing unit. Whenever the data corresponding to the first and second read requests is ready, it is provided to the first processing unit. In this way, multiple read requests may be issued in parallel, enabling faster access to the local memory of the one or more other processing units.

In step 410, the entire region of data is received from the other processing unit. For example, the first processing unit (e.g., CPU 302 or GPU 350) may request to read only a few bytes (e.g., 4 or 8 bytes) of a region (e.g., a 64-byte line) of the local memory of the second processing unit. Nonetheless, the second process unit sends the data from the entire region (e.g., 64-bytes of data).

In step 412, the data from the entire region is stored in a local buffer. Subsequent read requests for data in that region will be serviced from the local buffer, rather than from the local memory of the other processing unit.

B. Example Method for Processing a Read Request of Data in a Local Memory

Figure 5:
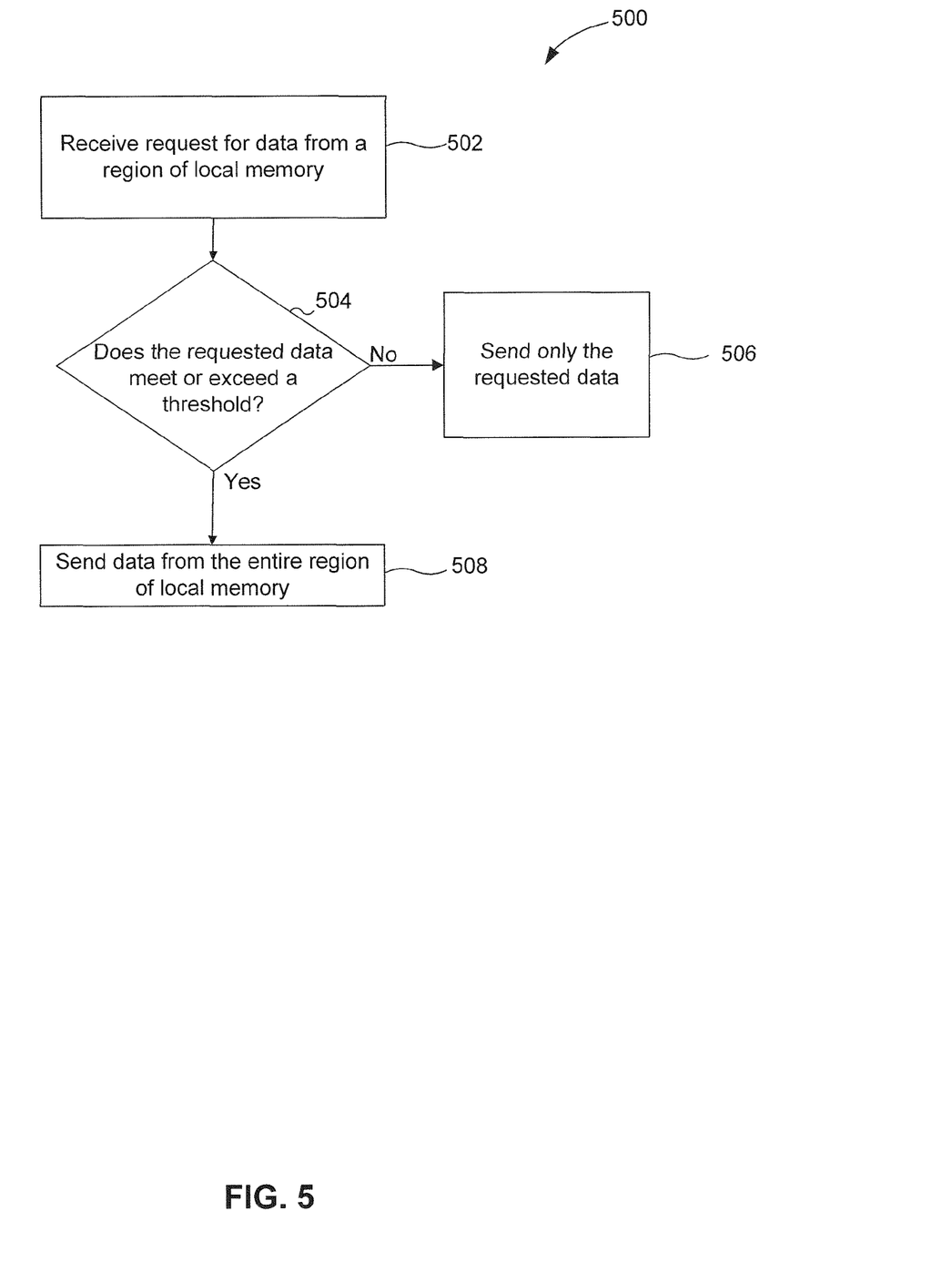
FIG. 5 is a flowchart illustrating an example method for receiving a request for data in accordance with an embodiment of the present invention.

FIG. 5 is a flowchart illustrating an example method 500, implemented by a second processing unit, for processing a request from a first processing unit to read data in a local memory of the second processing unit, in accordance with an embodiment of the present invention. For example, method 500 may be implemented by first GPU 350A or second GPU 350B of FIG. 3. Method 500 of FIG. 5 is described below with reference to structure illustrated in FIG. 3.

Method 500 begins at a step 502 in which the second processing unit receives a request to read data stored in the local memory of the second processing unit. For example, first GPU 350A may receive a request from either CPU 302 or second GPU 350B to read data from a region of local memory 352A of first GPU 350A. Similarly, second GPU 350B may receive a request from either CPU 302 or first GPU 350A to read data from a region of local memory 352B of second GPU 350B.

In step 504, it is optionally determined whether the requested data meets or exceeds a threshold. For example, it may optionally be determined if the requested data is at least 4 bytes, 8 bytes, or some other minimum amount of data. If the requested data does not meet or exceed the threshold, then only the requested data is sent to the requested processing unit, as illustrated in a step 506.

If the requested data meets or exceeds the threshold, or if step 504 is not included in method 500, then control flows to a step 508. In step 508, all data from the entire region containing the requested data is sent to the requesting processing unit. For example, the region of data may comprises a 64-byte line of memory or another region of memory. In this example, if the requested data is contained in a 64-byte line of data, then the entire 64-byte line of data is sent to the requesting processing unit. In this way, the requesting processing unit may store the entire region (e.g., a 64-byte line of memory) in a local buffer to enable faster access to data in that region.

V. Example Software Implementations

In addition to hardware implementations of CPU 302 and GPU 350, such processing units may also be embodied in software disposed, for example, in a computer-readable medium configured to store the software (e.g., a computer-readable program code). The program code causes the enablement of embodiments of the present invention, including the following embodiments: (i) the functions of the systems and techniques disclosed herein (such as, method 400 of FIG. 4 and/or method 500 of FIG. 5); (ii) the fabrication of the systems and techniques disclosed herein (such as, the fabrication of CPU 302 and/or GPU 350); or (iii) a combination of the functions and fabrication of the systems and techniques disclosed herein.

This can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (e.g., a CPU core or a GPU core) that is embodied in program code and may be transformed to hardware as part of the production of integrated circuits.

VI. Conclusion

Presented above are embodiments for enabling a first processing unit (e.g., a CPU or a GPU) to efficiently read a local memory of a second processing unit (e.g., a GPU), and applications thereof. It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A computer-implemented method, comprising:
   sending from a first processing unit, via an interface between the first processing unit and a second processing unit, a first request for a portion of data stored in a region of a local memory of the second processing unit, wherein the first processing unit is a central processing unit (CPU) and the second processing unit is a graphics processing unit (GPU);
   receiving, responsive to the first request, a copy of the data stored in the region;
   storing the received copy of the data in a buffer;
   sending a second request to the buffer, the second request being for a copy of a different portion of the data stored in the region of the local memory; and
   retrieving the copy of the different portion of the data from the data stored in the buffer.

2. The computer-implemented method of claim 1, wherein the region comprises a cache line.

3. The computer-implemented method of claim 1, further comprising:
   prior to the receiving, sending, via the interface, another request for a copy of data in stored in another region of the local memory of the second processing unit.

4. The computer-implemented method of claim 1, wherein the interface between the first processing unit and the second processing unit is a peripheral component interconnect express (PCIE) bus.

5. A processing unit, comprising:
   an interface configured to:
      send a first request for a portion of data stored in a region of a local memory of a second processing unit, wherein the processing unit is one of a CPU and the second processing unit is a GPU; and
      receive, responsive to the first request, a copy of the data stored in the region; and
   a buffer configured to store the received copy of the data, wherein the processing unit is configured to:
      send a second request for a copy of a different portion of the data stored in the region of the local memory to the buffer; and retrieve the copy of the different portion of the data from the data stored in the buffer.

6. The processing unit of claim 5, wherein the region comprises a cache line.

7. The processing unit of claim 5, wherein, prior to receiving the copy of the data from the region, the interface is further configured to send a subsequent request for a copy of a portion of data in another region of the local memory of the second processing unit.

8. The processing unit of claim 5, wherein the interface comprises a coupling to a PCIE bus.

9. A computing system, comprising:
a first processing unit comprising a CPU;
a second processing unit comprising a GPU coupled to a local memory; and
a buffer,
wherein the first processing unit comprises an interface configured to:
send a first request for a portion of data stored in a region of the local memory of the second processing unit; and
receive, responsive to the first request, a copy of the data stored in the region,
wherein the first processing unit is configured to:
send a second request for a different portion of the data stored in the region of the local memory to the buffer; and
retrieve the different portion of the data from the data stored in the buffer; and
wherein the buffer is configured to store the received copy of the data.

10. The computing system of claim 9, wherein the region comprises a cache line.

11. The computing system of claim 9, wherein, prior to receiving the copy of the data from the region, the interface is further configured to send a subsequent request for a copy of a portion of data in another region of the local memory of the second processing unit.

12. The computing system of claim 9, wherein the interface comprises a coupling to a PCIE bus.

13. A non-transitory computer-program product comprising a computer-readable storage medium containing instructions that, when executed on a computing device, cause a processing unit to perform operations comprising:
sending, via an interface between the processing unit and a second processing unit, a first request for a portion of data stored in a region of a local memory of the second processing unit,
wherein the first processing unit is a CPU and the second processing unit is a GPU; and
receiving, responsive to the first request, a copy of the data stored in the region;
storing the received copy of the data in a buffer;
sending a second request to the buffer, the second request being for a copy of a different portion of the data stored in the region of the local memory; and
retrieving the copy of the different portion of the data from the data stored in the buffer.

14. The non-transitory computer-program product of claim 13, wherein the processing unit is embodied in hardware description language software.

15. The non-transitory computer-program product of claim 14, wherein the processing unit is embodied in one of Verilog hardware description language software, Verilog-A hardware description language software, and VHDL hardware description language software.

\* \* \* \* \*

UNITED STATES PATENT AND TRADEMARK OFFICE
CERTIFICATE OF CORRECTION

PATENT NO. : 8,933,947 B2
APPLICATION NO. : 12/719628
DATED : January 13, 2015
INVENTOR(S) : Glen et al.

Page 1 of 1

It is certified that error appears in the above-identified patent and that said Letters Patent is hereby corrected as shown below:

IN THE CLAIMS

Claim 3, column 8, line 49, after "data" delete "in".

Signed and Sealed this
Sixteenth Day of June, 2015

Michelle K. Lee
*Director of the United States Patent and Trademark Office*